United States Patent
Ogawa

(10) Patent No.: US 7,196,736 B2
(45) Date of Patent: Mar. 27, 2007

(54) METHOD OF YC SEPARATION OF YC SEPARATION FILTER

(75) Inventor: Hideaki Ogawa, Yokohama (JP)

(73) Assignee: Victor Company of Japan, Limited, Yokohama (JP)

( * ) Notice: Subject to any disclaimer, the term of this patent is extended or adjusted under 35 U.S.C. 154(b) by 642 days.

(21) Appl. No.: 10/448,123

(22) Filed: May 30, 2003

(65) Prior Publication Data

US 2004/0032535 A1    Feb. 19, 2004

(30) Foreign Application Priority Data

May 31, 2002    (JP)    .............................. 2002-160295

(51) Int. Cl.
*H04N 9/78* (2006.01)
(52) U.S. Cl. ...................... 348/670; 348/663
(58) Field of Classification Search ................ 348/670, 348/663; *H04N 9/78*
See application file for complete search history.

(56) References Cited

U.S. PATENT DOCUMENTS

| | | | | |
|---|---|---|---|---|
| 5,686,972 A | * | 11/1997 | Kim ............................ | 348/663 |
| 5,815,220 A | * | 9/1998 | Marshall ...................... | 348/727 |
| 6,008,859 A | * | 12/1999 | Ito et al. ..................... | 348/540 |
| 6,288,754 B1 | * | 9/2001 | Ito .............................. | 348/663 |
| 6,300,985 B1 | * | 10/2001 | Lowe et al. ................. | 348/665 |
| 6,833,875 B1 | * | 12/2004 | Yang et al. ................. | 348/665 |

FOREIGN PATENT DOCUMENTS

JP    2001-112018    4/2001

* cited by examiner

*Primary Examiner*—Trang U. Tran
(74) *Attorney, Agent, or Firm*—Connolly Bove Lodge & Hutz LLP

(57) ABSTRACT

A YC separation filter of 3-dimensional YC separation for separating a luminance signal and a chromatic signal adaptively to motion of picture image. The YC Separation filter controls frame delay operation of an input composite video signal per clock period based on an hd signal generated from a sub carrier phase of input composite video signal, and controls frame delay operation of the input composite-video signal per period less than 1 clock by compensation filter based on a sampling phase detection result of the input signal, one frame delayed signal and two frames delayed signal. The YC separation filter obtains one frame delayed signal and two frames delayed signal synchronized to the phase of input composite video signal even the system clock is not synchronized to the input composite video signal.

2 Claims, 6 Drawing Sheets

METHOD OF YC SEPARATION OF YC SEPARATION FILTER

BACKGROUND OF THE INVENTION

1. Field of the Invention

The present invention relates to a method of YC separation and a YC separation filter, especially to a 3-dimensional YC separation filter for use in a digital video separated in luminance and chrome signal from NTSC composite video signal by digital signal processing.

2. Description of the Related Art

FIG. 1 is a block diagram of YC separation filter according to the related art. An NTSC composite video signal is multiplexed with a base band luminance signal and a carrier color signal. A carrier signal modulates a sub carrier having frequency fsc by two types of color signal. Then the carrier signal is multiplexed in the high frequency range of the base band luminance signal. The composite video signal is, for example, separated into a luminance signal and a chromatic signal by YC separation filter to initiate independent signal processing on the luminance signal and the chromatic signal respectively.

In FIG. 1, a YC separation filter is composed of an AD converter 31, 2-dimensional YC separation filter 32, a reducer 33, frame memories 34 and 35, an amplifier 36, a switch 37, a motion detection circuit 38 and a reducer 39.

The AD converter 31 converts an input composite signal into digital signal (a composite video data) by sampling the composite signal with a clock signal synchronized with color burst signal having a frequency of 4 fsc. Then the composite video data is supplied to the 2-dimensional YC separation filter 32 which separates chromatic signal and provides the chromatic signal to one terminal of switch 37, and to the reducer 33, the motion detection circuit 38 and the frame memory 34 respectively.

The reducer 33 reduces an output of frame memory 34 from the composite video data, wherein the frame memory 34 delays the composite video data for one frame period. The chromatic signal is separated by the characteristic of comb filter in the frame period. The chromatic signal is amplified for half amplitude by the amplifier 36 and then supplied to the other terminal of switch 37. The output of frame memory 34 is supplied to the frame memory 35 and delayed for one frame period and supplied to the motion detection circuit 38.

The motion detection circuit 38 compares output signals from the AD converter 31, and the frame memories 34 and 35 and detects movement of an image signal. If the motion detection circuit 38 detects movement, the switch 37 selects the output from the 2-dimensional YC separation filter 32, which is a chromatic signal. If the motion detection circuit 38 detects no movement, the switch 37 selects the output from the amplifier 36, which is also a chromatic signal.

The switch 37 outputs chromatic signal and provides it to the reducer 39. The reducer 39 reduces the chromatic signal from the composite video data to separate and output a luminance signal.

A clock signal having frequency of 4 fsc synchronized with color burst signal for sampling a composite video signal meeting with NTSC standard is calculated as follows;

$$4\,fsc = 4 \times (455/2) \times fh = 910 \times fh \quad (1)$$

(fh is a horizontal scanning frequency)

The delay timing for 525 horizontal scanning lines are necessary to obtain one frame delay. Accordingly, the amount of delay is calculated as follows;

$$910[T/\text{Line}] \times 525[\text{Line/Frame}] = 477750[T/\text{Frame}] \quad (2)$$

T indicated in the equation (2) represents sampling period 1/(4 fsc). The delay period of one frame can be obtained by 477750T delay.

As to digital video recorder such as DV format digital video camera and D-VHS (registered trademark) system, the clock signal of 13.5 MHz frequency is used and this clock frequency is independently generated from the input signal.

For example, it is supposed that this clock signal is used for YC separation filter, the filter can not obtain one frame delay of composite video data because the clock signal is not locked with the input composite signal.

The frequency of 13.5 MHz is 858 times of horizontal scanning frequency fh of NTSC format. Accordingly, the delay amount is indicated as;

$$858 \times 525 = 450450T' \quad (3)$$

(T' is sampling period 1/13.5 MHz)

However, it is supposed that input composite signal of 1H (H is a horizontal scanning period) is indicated as 858.1T that the delay amount is indicated as;

$$858.1 \times 525 = 450502.5T' \quad (4)$$

In this sense, if the delay timing is fixed to 450450T', the YC separation filter shown in FIG. 1 can not provide an appropriate operation of YC separation because the one frame delay timing is different from the actual delay timing for the input composite signal.

SUMMARY OF THE INVENTION

In consideration of the above problem, the present invention provides a YC separation filter which can provide an accurate one frame delay and two frames delay of input composite signal even the clock signal is not locked with the phase of the burst signal of the input composite signal.

Accordingly, in consideration of the above-mentioned problems of the related art, an object of the present invention is to provide a YC separation filter including a YC separation circuit for separating luminance signal and chromatic signal from an input composite video signal sampled by predetermined clock timing, adaptive to a motion of video signal, by one frame delayed signal and two frames delayed signal of the input composite video signal;

a decoder for decoding a color difference signal from the chromatic signal outputted from the YC separation circuit, and obtaining a phase value of a sub carrier of the input composite video signal; a sampling phase detection means for detecting sampling phase information under sampling period of predetermined clock and phase value of the sub carrier; a delay means for receiving a time-series combined signal of the input composite video signal and the sampling phase information, and outputting a first combined signal delayed for one frame and a second combined signal delayed for two frames through a memory; a first compensation filter for outputting composite video signal in the first combined signal by controlling a transfer function of the filter to synchronize sampling phase extracted from the first combined signal and from the sampling phase detection means; a second compensation filter for outputting composite video signal in a second combined signal by controlling a transfer function of filter to synchronize sampling phase extracted from the second combined signal and from the sampling phase detection means; and a control means for controlling the delay means by one clock order based on a timing signal which becomes predetermined value once in the timing corresponding to sampling phase information from the sampling phase detection means; wherein the first compensation filter provides the first combined signal delayed for one frame as an one frame delayed signal, and the second compensation filter provides the second combined signal delayed for two frames as a two frames delayed signal.

Another object of the present invention is to provide a method for YC separation of a composite video signal comprising the steps of; separating luminance signal and chromatic signal from an input composite video signal sampled by predetermined clock timing, by one frame delayed signal and two frames delayed signal of the input composite video signal adaptive to the motion of the video signal; decoding a color difference signal from the chromatic signal separated from the input composite video signal, and obtaining a phase value of the sub carrier of the input composite video signal; detecting sampling phase information under sampling period of a predetermined clock and a phase value of sub carrier of the input composite video signal; outputting through a memory, one frame delayed signal and two frames delayed signal respectively, which signal is combined the input composite video signal with a sampling phase information; compensating a phase information of one frame delayed signal to synchronize the phase information of one frame delayed signal and the sampling phase information, and compensating the phase information of two frames delayed signal to synchronize the phase information of the two frames delayed signal and the sampling phase information; controlling one clock order based on a timing signal which becomes predetermined value once in the timing corresponding to the sampling phase information from the sampling phase detection means; wherein the first compensation filter provides the first combined signal delayed for one frame as an one frame delayed signal, and the second compensation filter provides the second combined signal delayed for two frames as a two frames delayed signal.

Other object and further features of the present invention will be apparent from the following detailed description when read in conjunction with the accompanying drawings.

DETAILED DESCRIPTION OF THE PREFERRED EMBODIMENTS

Figure 2:
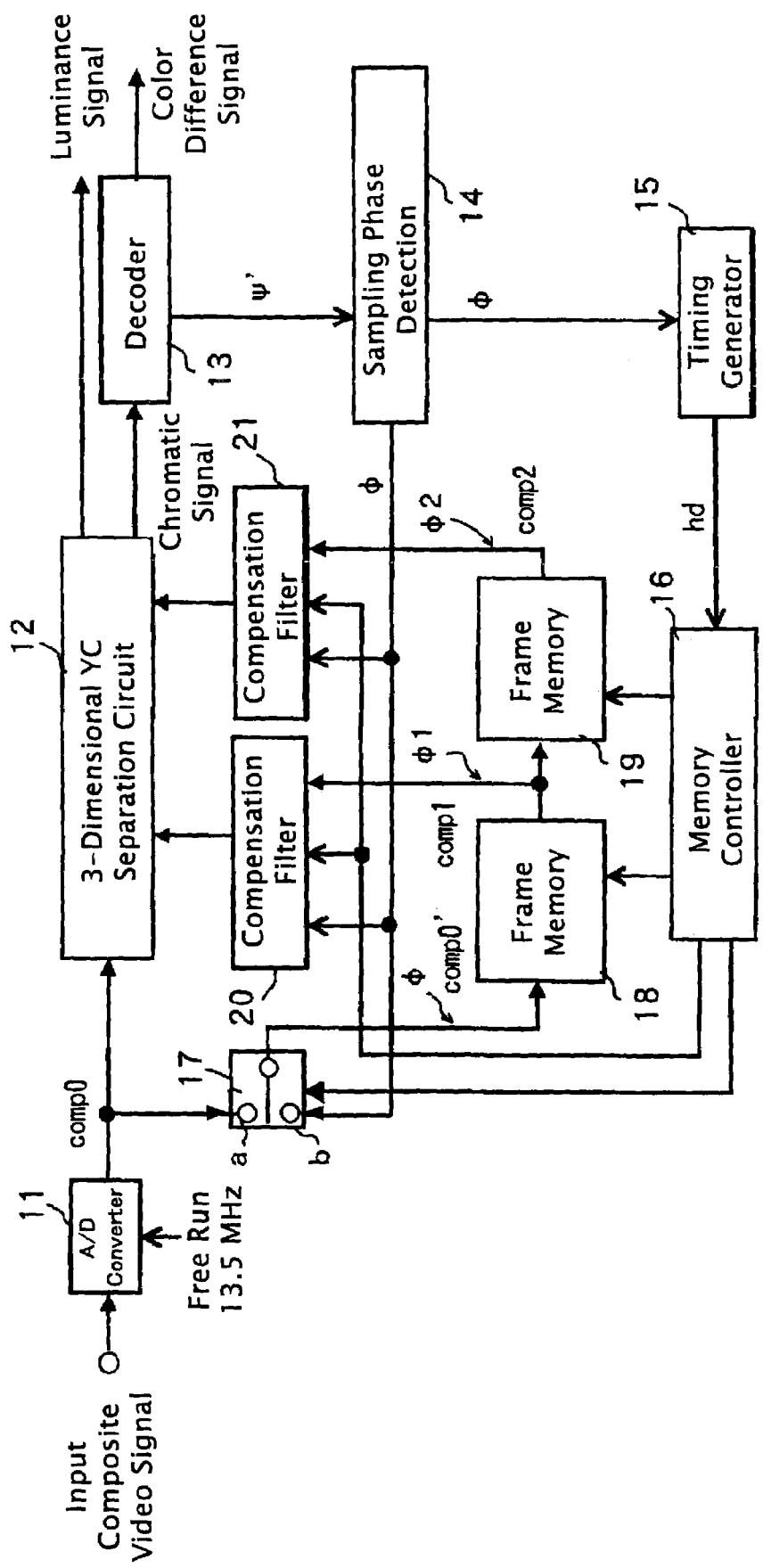
FIG. 2 is a block diagram of YC separation filter according to the present invention.

FIG. 2 is a block diagram of YC separation filter according to the present invention. The present invention provides a YC separation filter for controlling one frame delay and two frames delay per one clock and controlling delay operation for less than one clock period. The first delay control conducts delay operation per one clock by frame control using an hd signal generated from the phase of sub carrier of the input signal. The second delay control conducts delay operation per less than one clock period by a compensation filter to be described below by the result of sampling phase detection of the input signal, one frame delay signal and two frames delay signal.

The second delay control detects the phase difference between the present signal and the phase sampling of one frame delay signal and two frames delay signal, and compensates such the phase difference by a compensation filter.

In FIG. 2, the YC separation filter is composed of AD converter 11, a 3-dimensional YC separation filter 12, a chromatic decoder 13, a phase sampling detection circuit 14, a timing generator 15, a memory controller 16, a switch 17, frame memories 18 and 19, and compensation filters 20 and 21.

NTSC composite video signal in analog signal form is provided to AD converter 11. The AD converter 11 is supplied with a clock of 13.5 MHz and converts the NTSC composite video signal into digital composite data comp0. The digital composite data comp0 is supplied to one terminal of switch 17 and the 3-dimensional YC separation filter 12 respectively. The 3-dimensional YC separation filter 12 separates the digital composite data comp0 into luminance signal and chromatic signal, and provides the chromatic signal to a chromatic decoder 13.

Figure 1:
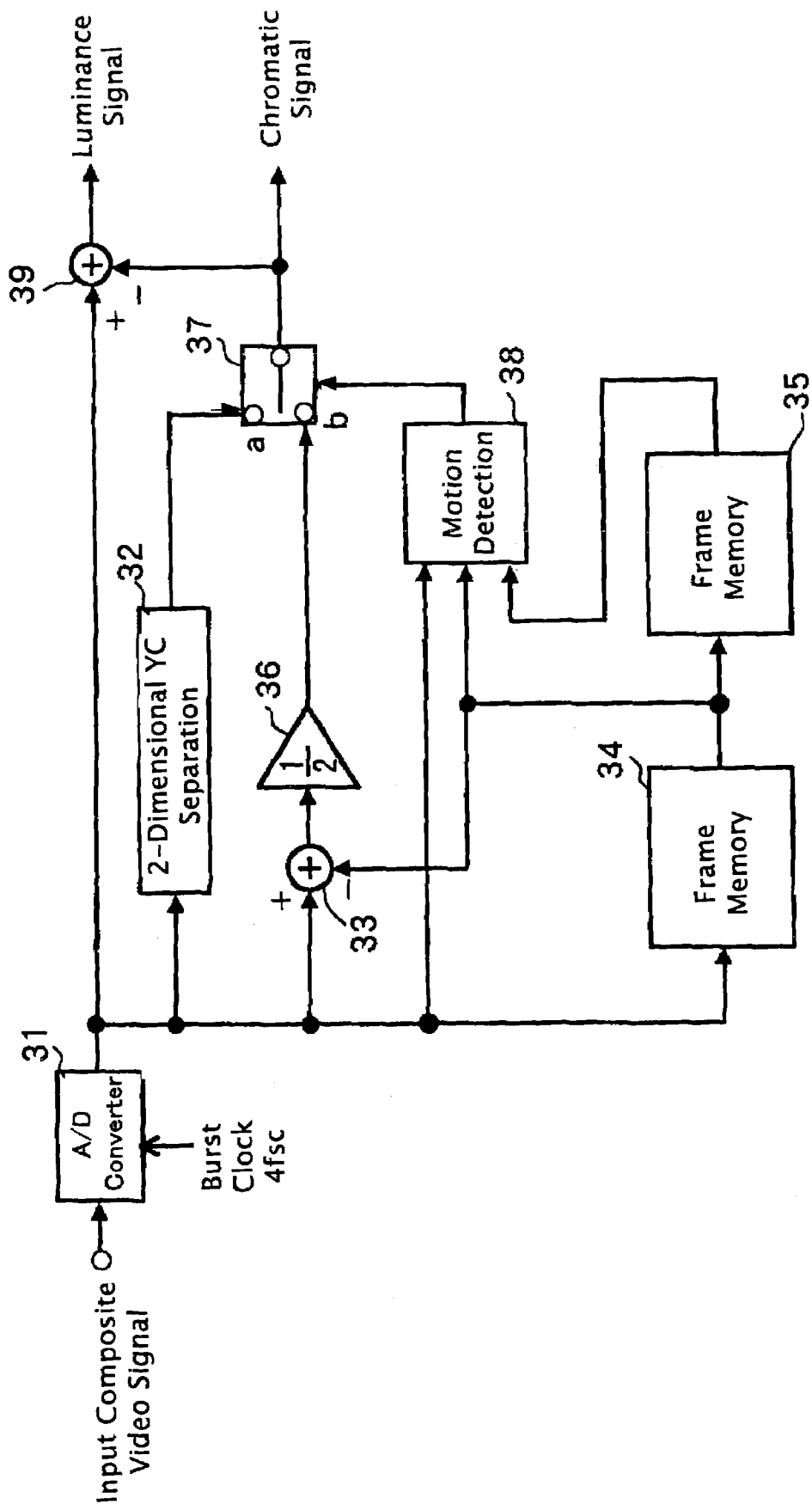
FIG. 1 is a block diagram of YC separation filter according to the related art.

The 3-dimensional YC separation filter 12 has the same components of the YC separation filter shown in FIG. 1 excluding the AD converter 31 and the frame memories 34 and 35 therein. The delayed signal is provided to the YC separation filter 12 from the compensation filter to be described below.

The chromatic signal from the 3-dimensional YC separation filter 12 is supplied to the chromatic decoder 13. The chromatic decoder 13 decodes two types of color-difference signal and outputs sub carrier having phase value of ψ'.

Figure 3:
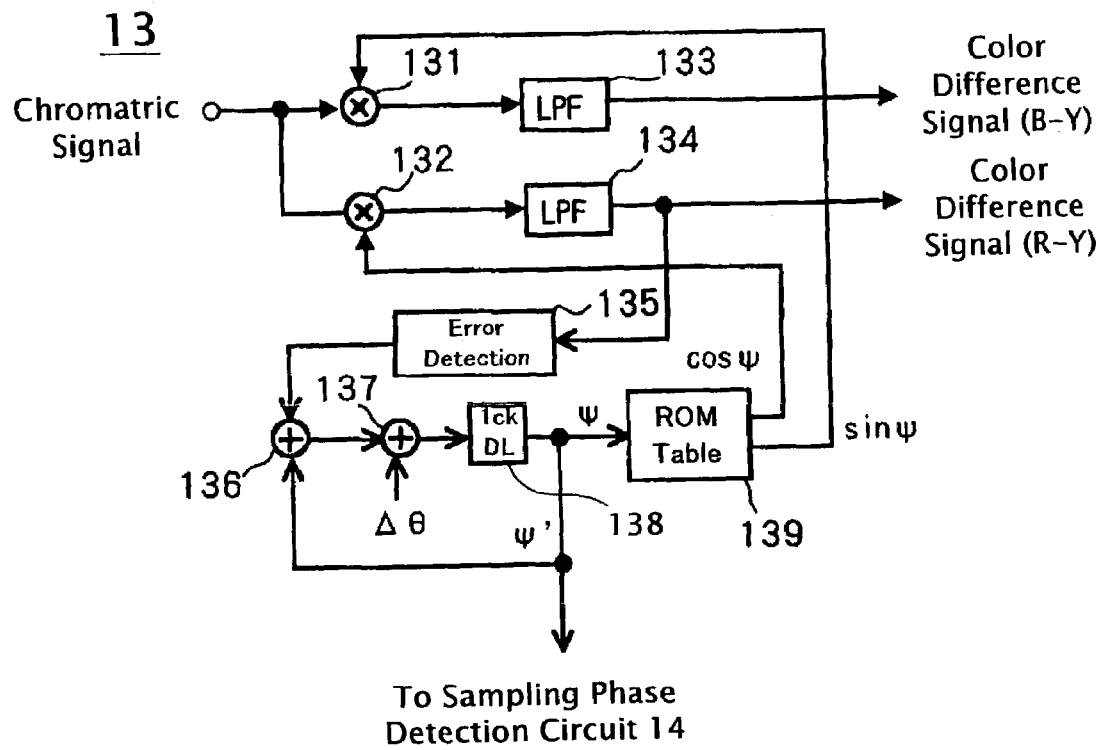
FIG. 3 is a block diagram of a chromatic decoder shown in FIG. 2.

FIG. 3 is a block diagram of the chromatic decoder shown in FIG. 2. The chromatic decoder 13 is composed of multipliers 131 and 132, low-pass filters (LPF) 133 and 134, error detection 135, adders 136 and 137, one clock delay circuit 138, and a ROM table 139.

The chromatic decoder 13 outputs signals sin ψ and cos ψ from the ROM table 139, which have a sub carrier frequency synchronized with color burst signal of the input composite video signal. The signals sin ψ and cos ψ is multiplied to input chromatic signal by the multipliers 131 and 132. The output of the multipliers 131 and 132 are provided to low-pass filters 133 and 134 to obtain color difference signals (B−Y) and (R−Y).

The signals sin ψ and cos ψ, which have a sub carrier frequency synchronized with color burst signal of the input composite video signal can be obtained by calculating sub carrier phase value ψ, and the sine value and cosine value of the phase value ψ is referred to by the ROM table 139.

The decoded color difference signal (R−Y) is supplied to error detection 135 so that an error value in a burst period is detected. In this sense, an amplitude of the color difference (R−Y) should be zero during the burst period that the error value is obtained by detection of the amplitude from zero in this period.

The signal other than the burst period is a decoded video signal that an error value can not be detected so that the error value other than the burst period is fixed to zero.

The error value detected by the error detection 135 is provided to the adder 136. The adder 136 adds an output $\psi'$ of one clock delay circuit 138 and the error value, and supplies the result to the adder 137. The adder 137 adds a predetermined value signal $\Delta\theta$ and the output of the adder 136, and supplies the result to the one clock delay circuit 138. These signals are accumulated in the loop of adders 136 and 137, and one clock delay circuit 138.

The phase value $\psi$ outputted from the one clock delay circuit 138 is provided to the ROM table 139, and the ROM table 139 outputs the sine and cosine value corresponding to the phase value $\psi$.

The phase value $\psi$ (n bits; wherein n is the natural number) in digital is extended by 8 bits to the upper order side of the MSB(Most Significant bit). The extended phase value $\psi$ is indicated as $\psi'((n+8)bits))$ and the top 8 bits are treated as a sub carrier counter which counts up one at every one period of sub carrier.

The sub carrier frequency fsc and the horizontal scanning frequency have following relation;

$$fsc = (455/2) \times fh \quad (5)$$

In the case that the clock is synchronized with the input signal, $\psi'$ counts up for 227.5 which can be indicated 1110 0011 1000 000 . . . in digital wherein the high order of 8 bits represent the integral part in one horizontal scanning period 1H. If the clock is not synchronized with the input signal, $\psi'$ counts up for something different from 227.5 in the 1H period.

The phase value $\psi'$ which is the sub carrier phase value $\psi$ from the one clock delay circuit 138 added with high order of 8 bits is provided to the sampling phase detection circuit 14 shown in FIG. 2. The sampling phase detection circuit 14 detects a difference between 227.5 in every 1H period as a sampling phase $\emptyset$.

Figure 4:
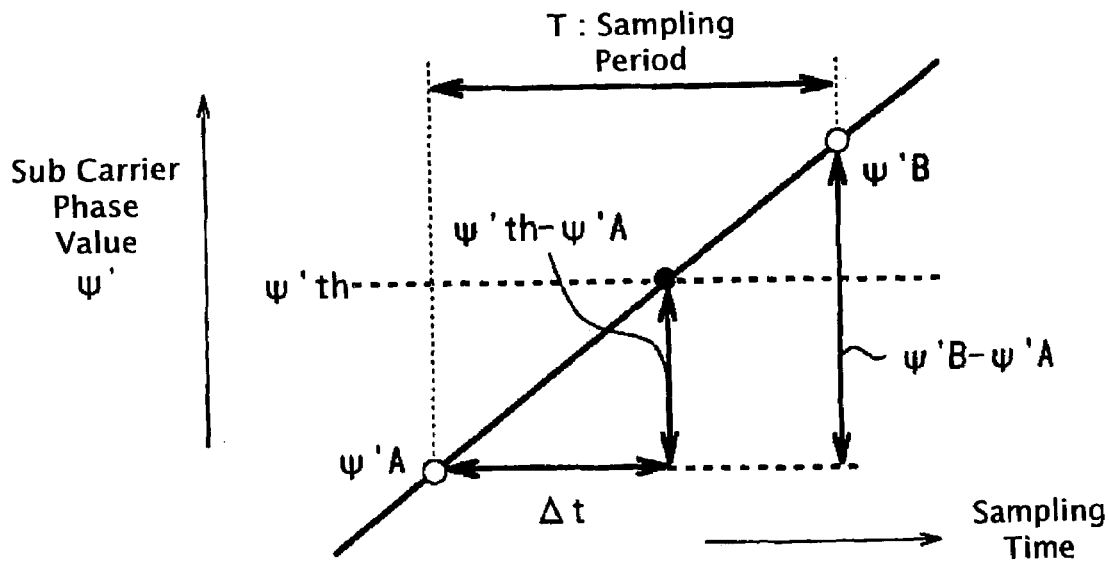
FIG. 4 is a diagram for explaining the relation of sampling time and phase value of sub carrier of the input composite signal.

FIG. 4 is a diagram for explaining the relation of sampling time and phase value of sub carrier of the input composite signal. In FIG. 4, the value $\psi'$th is a reference value of sampling phase detection 227.5, and $\psi'A$ and $\psi'B$ are a sampling value in a predetermined sampling interval which satisfies following relation;

$$\psi'A < \psi'th \leq \psi'B$$

An error value of sampling portion other than the burst period is zero that the relation of sampling time and sampling phase value becomes liner curve (that an inclination is $\Delta\theta/T$, wherein T is a sampling period). A time $\Delta t$ which is the time to obtain sub carrier phase value $\psi'$th from the phase value $\psi'A$ is calculated as follows;

$$\Delta t = (\psi'th - \psi'A)/(\psi'B - \psi'A) \times T \quad (6)$$

Multiply the equation (6) by 1/T, the following is obtained;

$$\Delta t/T = (\psi'th - \psi'A)/(\psi'B - \psi'A) \quad (7)$$

$\Delta t/T$ is bigger than 0 and less than or equal to 1 which defines the sampling phase $\emptyset$ as follows;

$$0 < \Delta t/T \leq 1$$

The sampling phase detection circuit 14 calculates the sampling phase $\emptyset$ by the equation (7), above.

A phase compensation for less than 1 clock is conducted based on the result of sampling phase detection. It is conducted by making the sampling phase $\emptyset 1$ of one frame delay signal comp1 and the sampling phase $\emptyset 2$ of two frames delay signal comp2 equal to the sampling phase $\emptyset$ of the present signal comp0. The sampling phase $\emptyset$ of the present signal comp0 is provided to compensation filters 20 and 21, and to the "b" terminal of switch 17.

The phase detection is conducted for once in 1H period. Phase information is multiplexed with the digital composite data comp0 by control signal from the memory control 16. The switch 17 initially selects "a" terminal and switches to "b" terminal by the control signal from the memory control 16 when the phase information is multiplexed with the composite data. The switch 17 selects "b" terminal for the time more than 1T and the time not causing any affect on the picture.

The signal multiplication is conducted in outside area of an effective picture area. The switch 17 outputs either composite data comp0 or sampling phase $\emptyset$ detected by the sampling phase detection circuit 14 and provides it to the frame memory 18. The frame memory 18 delays and outputs one frame delayed signal comp1 and sampling phase $\emptyset 1$ to the frame memory 19. The frame memory 19 delays and outputs two frame delayed signal comp2 and sampling phase $\emptyset 2$.

The compensation filter 20 is provided with delayed signal comp1 and sampling phase $\emptyset 1$, and the compensation filter 21 is provided with delayed signal comp2 and sampling phase $\emptyset 2$. The filters 20 and 21 respectively output phase information (sampling phase $\emptyset 1$ and $\emptyset 2$) which are multiplexed by the control signal from the memory control 16. The compensation filters 20 and 21 control the transfer function of the filter by the sampling phase $\emptyset$ outputted from the sampling phase detection circuit 14, and the sampling phase $\emptyset 1$ and $\emptyset 2$.

In the case of the compensation filter 20, the compensation is to make the sampling phase value of the data comp1 and the data comp0 in phase. It is supposed that a sub carrier phase value of composite data comp0 is $\psi'A$ and $\psi'B$, and a sub carrier phase value of composite data comp1 is $\psi'A1$ and $\psi'B1$, $\psi'A$ and $\psi'B$ should be calculated by $\psi'A1$ and $\psi'B1$ to make the composite data comp1 and comp0 in phase.

Figure 5:
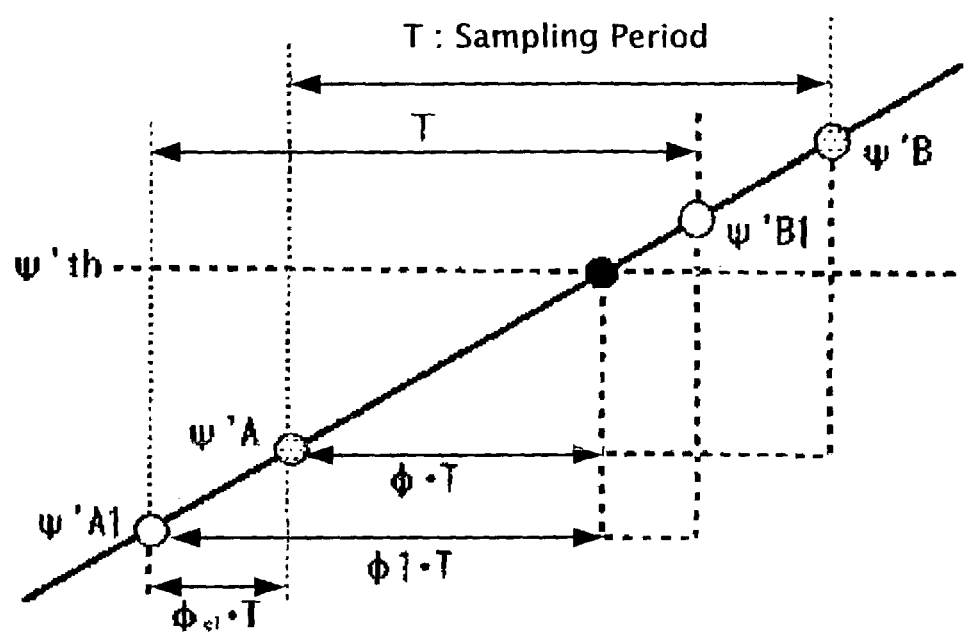
FIG. 5(a) is a diagram for explaining the relation of sampling time and phase of sub carrier in accordance with the present invention when $ø1 \geq ø$.
FIG. 5(b) is a diagram for explaining the relation of sampling time and phase of sub carrier in accordance with the present invention when $ø1 < ø$.
Figure 5:
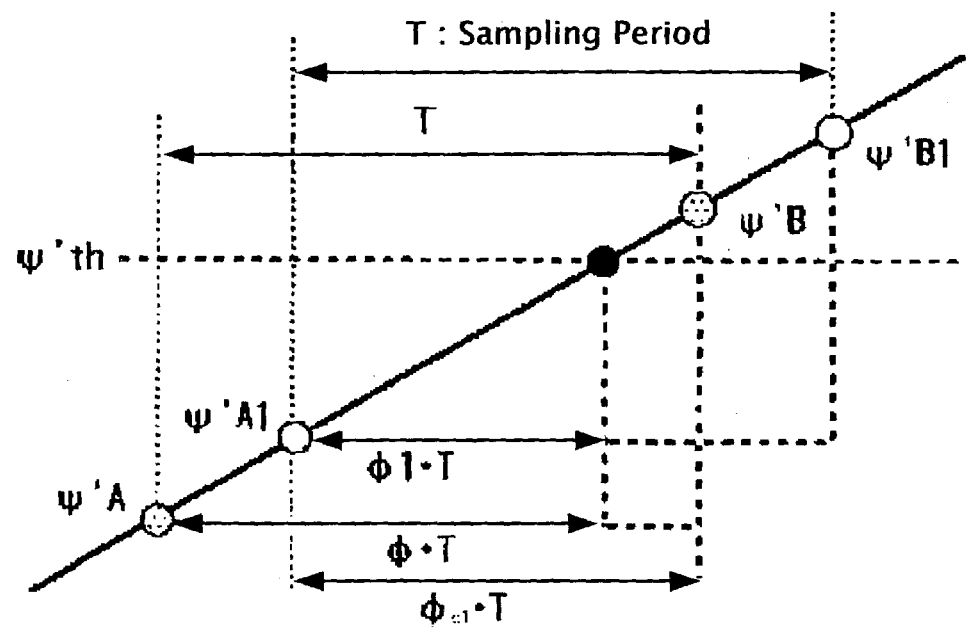

FIGS. 5(a) and 5(b) are diagrams for explaining the relation of sampling time and phase value of sub carrier of the input composite signal when $\emptyset 1 \geq \emptyset$ and $\emptyset 1 < \emptyset$, respectively.

It is supposed that a compensation phase $\emptyset_{c1}$ is compensation value to make the data comp1 and the data comp0 in phase, it can be calculated as follows;

$$\emptyset_{c1} \times T = \emptyset 1 \times T - \emptyset \times T \text{ (when } \emptyset 1 \geq \emptyset \text{) and}$$

$$\emptyset_{c1} \times T = T - (\emptyset \times T - \emptyset 1 \times T) \text{ (when } \emptyset 1 < \emptyset) \quad (8)$$

accordingly, $$\emptyset_{c1} = \emptyset 1 - \emptyset \text{ (when } \emptyset 1 \geq \emptyset \text{) and}$$

$$\emptyset_{c1} = \emptyset 1 - \emptyset + 1 \text{ (when } \emptyset 1 < \emptyset) \quad (9)$$

Similarly, the compensation phase $\emptyset_{c2}$ for the compensation filter 21 can be calculated as follows;

$$\emptyset_{c2} = \emptyset 2 - \emptyset \text{ (when } \emptyset 2 \geq \emptyset \text{) and}$$

$$\emptyset_{c2} = \emptyset 2 - \emptyset + 1 \text{ (when } \emptyset 2 < \emptyset) \quad (10)$$

A sampling phase $\emptyset$ could be any value but in a digital signal processing, a sampling phase should be determined within a limited range. For example, compensation is conducted in an accuracy of 1/8 of one clock period. Then the compensation phase value becomes either 0.125, 0.25, 0.375, 0.5, 0.625, 0.75, or 0.875.

To conduct the phase compensation by the compensation filters 20 and 21, the transfer function of either compensation filter 20 or filter 21 should be selected based on the result of detection of the compensation phase.

For example, the transfer function of the compensation filter is provided as following transfer function G(z) of 6 taps;

$$G(z)=39/64(Z^{-2}+Z^{-3})-9/64(Z^{-2}+Z^{-3})+2/64(Z^{-2}+Z^{-3}) \quad (11)$$

accordingly, each compensation phase value is indicated as follows;

$$0.125{:}H1(z)=1/2(H2(z)+z^{-4}) \quad (12)$$

$$0.25{:}H2(z)=9/16(G(z)z^{-1}+z^{-4})-1/16(z^{-3}+G(z)z^{-2}) \quad (13)$$

$$0.375{:}H3(z)=1/2(H2(z)+H4(z)) \quad (14)$$

$$0.5{:}H4(z)=G(z)z^{-1} \quad (15)$$

$$0.625{:}H5(z)=1/2(H4(z)+H6(z)) \quad (16)$$

$$0.75{:}H6(z)=9/16(z^{-3}+G(z)z^{-1})-1/16(G(z)+z^{-4}) \quad (17)$$

$$0.875{:}H7(z)=1/2(z^{-3}+H6(z)) \quad (18)$$

For example, if the compensation phase of the filters 20 and 21 is 0.5, which is the middle point of the sampling interval, the transfer function indicated as (15) is selected. If the compensation phase is (0.25, 0.75) which is the middle point of 0 between 0.5 and 0.5 between 1, the transfer function is 4 taps filter as indicated in equation (13) or (17). If the compensation phase is (0.125, 0.375, 0.625, 0.875) which is the middle point of 0 between 0.25, and 0.5, and 0.75 and 1, the transfer function is 2 taps filter as indicated in equation (12), (14), (16) or (18).

Figure 6:
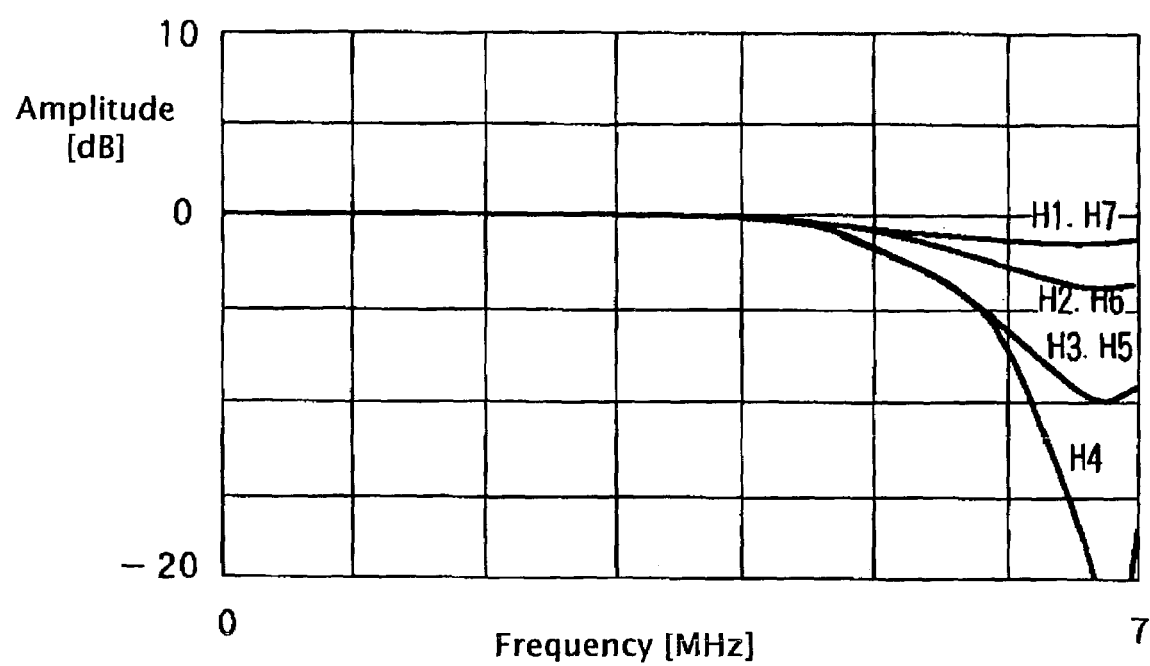
FIG. 6 is a frequency characteristic of transfer function in accordance with the present invention.

FIG. 6 is a frequency characteristic of transfer function in accordance with the present invention. The compensation filters 20 and 21 are controlled by the transfer function as described above. The compensation filter 20 outputs one frame delayed composite data and the compensation filter 21 outputs two frames delayed composite data which phase has been compensated for a timing less than 1 clock.

The first delay control as described above, using an hd signal generated from the phase of sub carrier of the input signal is conducted as follows.

The hd signal is generated by the timing generator 15 which receives sampling phase ø outputted by the sampling phase detection circuit 14. The hd signal becomes high level once in a 1H period and is provided to the memory control 16 which controls write/readout operation of the frame memories 18 and 19.

As to obtain 1 frame delayed signal and 2 frames delayed signal from the compensation filters 20 and 21 respectively, in precise 1 clock timing, the hd signal should be generated from the same basis of sampling phase detection. Accordingly, as in the case of FIG. 4, the timing generator 15 generates the hd signal in the timing of the phase of sub carrier becomes ψ'B (or delayed for some amount).

As mentioned above, one frame is 525H period that the 1 frame delay control in 1 clock order is conducted by writing data comp0 into line m of the memory 18 in the timing of hd (m) signal, and reading-out the stored data as data comp1 in the timing of hd (m+525) signal.

Figure 7:
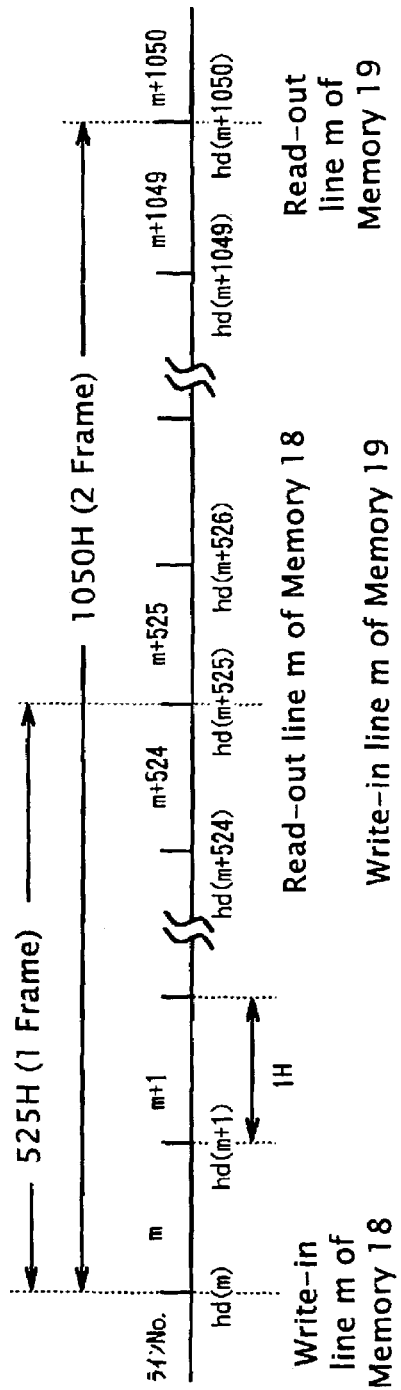
FIG. 7 is a chart of write-readout timing of a frame memory shown in FIG. 2.

FIG. 7 is a chart of write-readout timing of a frame memory shown in FIG. 2.

Similarly, a 2 frames delayed control is conducted by reading-out the data comp1 from the memory 18 in the timing of hd signal (m+525) and writing the data into the memory 19, and reading-out the data comp2 from the memory 19 in the timing of hd signal (m+1050).

Further, storing data in memories 18 and 19 is stopped at blanking portion of video signal to increase efficiency of memory.

Figure 8:
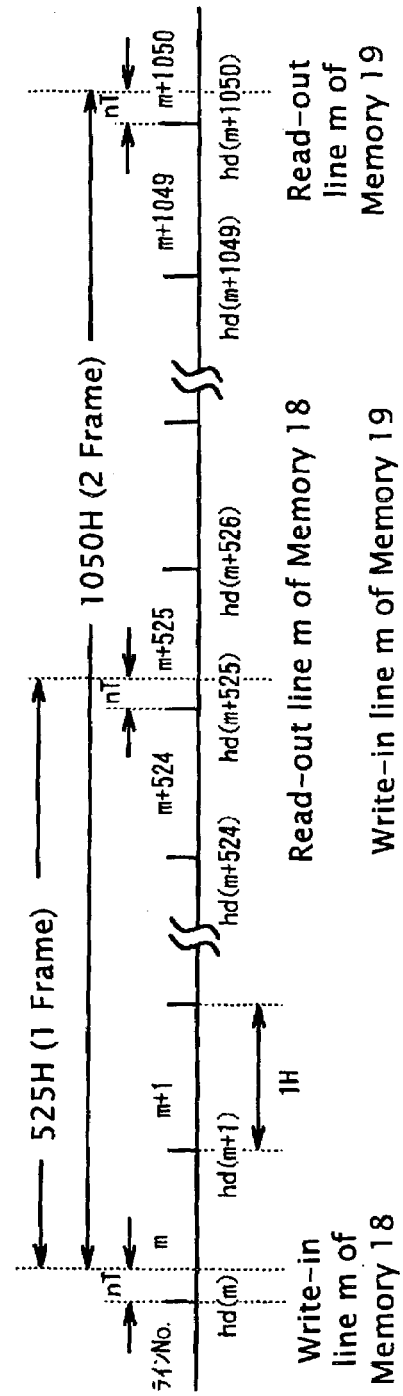
FIG. 8 is another chart of write-readout timing of a frame memory shown in FIG. 2.

FIG. 8 is another chart of write-readout timing of a frame memory shown in FIG. 2. In the case that the memories 18 and 19 stop writing operation at the blanking portion of the video signal, the writing and read-out operation is carried out in the timing shown in FIG. 8. The writing and read-out operation to the memories 18 and 19 start at the timing of the hd signal delayed for nT.

The present invention is not limited to the embodiment described above. The sampling clock frequency is not limited to 13.5 MHz that it can be 27 MHz which is double times of 13.5 MHz, or any other sampling frequency. Further, the accuracy of phase detection is not limited to ⅛ of one clock. It can be 1/16 or 1/32 of one clock, or even higher accuracy. A higher accuracy may enlarge the scale of filter circuit so that it can provide high performance of 3-dimension YC separation.

As described above, the present invention provides the one frame delayed signal and two frames delayed signal which phases are synchronized with the input composite video signal so that the 3-dimension YC separation can be performed even the clock for sampling the input composite signal is not synchronized with the color burst signal in the input composite signal.

[Closing Paragraph]

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

What is claimed is:

1. A YC separation filter comprising:
   a YC separation circuit for separating luminance signal and chromatic signal from an input composite video signal sampled by predetermined clock timing, adaptive to a motion of the composite video signal, by one frame delayed signal and two frames delayed signal of the input composite video signal;
   a decoder for decoding a color difference signal from the chromatic signal outputted from the YC separation circuit, and obtaining a phase value of a sub carrier of the input composite video signal;
   a sampling phase detection means for detecting sampling phase information under sampling period of predetermined clock and the phase value of the sub carrier;
   a delay means for receiving a time-series combined signal of the input composite video signal and the sampling phase information, and outputting a first combined signal delayed for one frame and a second combined signal delayed for two frames through a memory;
   a first compensation filter for outputting composite video signal in the first combined signal by controlling a transfer function of the first compensation filter to synchronize sampling phase extracted from the first combined signal and the sample phase information from the sampling phase detection means;
   a second compensation filter for outputting composite video signal in the second combined signal by controlling a transfer function of second compensation filter to synchronize sampling phase extracted from the second combined signal and the sample phase information from the sampling phase detection means; and a control means for controlling the delay means by one clock order based on a timing signal which becomes predetermined value once in the timing corresponding to the sampling phase information from the sampling phase detection means;

wherein the first compensation filter provides the first combined signal delayed for one frame as an one frame delayed signal, and the second compensation filter provides the second combined signal delayed for two frames as a two frames delayed signal.

2. A method for YC separation of a composite video signal comprising the steps of;

separating luminance signal and chromatic signal from an input composite video signal sampled by predetermined clock timing, by one frame delayed signal and two frames delayed signal of the input composite video signal adaptive to the motion of the input composite video signal;

decoding a color difference signal from the chromatic signal separated from the input composite video signal, and obtaining a phase value of the sub carrier of the input composite video signal;

detecting sampling phase information under sampling period of a predetermined clock and the phase value of sub carrier of the input composite video signal;

outputting through a memory, one frame delayed signal and two frames delayed signal respectively, which signal is combined the input composite video signal with the sampling phase information;

compensating a phase information of one frame delayed signal to synchronize the phase information of one frame delayed signal and the sampling phase information, and compensating the phase information of two frames delayed signal to synchronize the phase information of the two frames delayed signal and the sampling phase information;

controlling one clock order based on a timing signal which becomes predetermined value once in the timing corresponding to the sampling phase information from the sampling phase detection means;

wherein a first compensation filter provides a first combined signal delayed for one frame as said one frame delayed signal, and a second compensation filter provides a second combined signal delayed for two frames as said two frames delayed signal.

* * * * *